US012665838B2

(12) United States Patent
Luo

(10) Patent No.: US 12,665,838 B2
(45) Date of Patent: Jun. 23, 2026

(54) CONNECTION STATUS DETECTION METHOD AND RELATED DEVICE

(71) Applicant: HUAWEI TECHNOLOGIES CO., LTD., Shenzhen (CN)

(72) Inventor: Xiangan Luo, Mexico City (MX)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 360 days.

(21) Appl. No.: 17/955,905

(22) Filed: Sep. 29, 2022

(65) Prior Publication Data

US 2023/0027348 A1      Jan. 26, 2023

Related U.S. Application Data

(63) Continuation of application No. PCT/CN2021/070591, filed on Jan. 7, 2021.

(30) Foreign Application Priority Data

Mar. 31, 2020    (CN) .......................... 202010246493.2

(51) Int. Cl.
*H04L 45/00* (2022.01)
*H04L 43/0811* (2022.01)
(52) U.S. Cl.
CPC .......... *H04L 45/26* (2013.01); *H04L 43/0811* (2013.01); *H04L 45/34* (2013.01)
(58) Field of Classification Search
CPC ..... H04L 45/26; H04L 43/0811; H04L 45/34; H04L 43/10; H04L 45/70
See application file for complete search history.

(56) References Cited

U.S. PATENT DOCUMENTS

| | | | |
|---|---|---|---|
| 9,497,107 | B1 | 11/2016 | Akiya et al. |
| 10,447,571 | B2 | 10/2019 | Nainar et al. |
| 2016/0261474 | A1* | 9/2016 | Raghavan ............... H04L 43/10 |
| 2018/0077051 | A1 | 3/2018 | Nainar et al. |
| 2019/0222500 | A1 | 7/2019 | Nainar et al. |
| 2020/0076724 | A1* | 3/2020 | Nainar ................ H04L 43/0852 |
| 2021/0092037 | A1* | 3/2021 | Rathi ...................... H04L 45/26 |

FOREIGN PATENT DOCUMENTS

| | | | |
|---|---|---|---|
| CN | 105337785 | A | 2/2016 |
| CN | 105337785 | B * | 10/2018 ............. H04L 43/00 |
| CN | 110417651 | A | 11/2019 |
| CN | 110798403 | A | 2/2020 |
| CN | 110855531 | A | 2/2020 |
| CN | 112152867 | A * | 12/2020 ............. H04L 43/08 |

(Continued)

OTHER PUBLICATIONS

CN105337785B—English Translated (Year: 2025).*

(Continued)

*Primary Examiner* — Ji-Hae Yea

(57) ABSTRACT

A connection status detection method used for detecting connectivity of a segment routing (SR) path between nodes is disclosed. After receiving a path detection packet, a first node responds to the path detection packet based on connectivity of an SR path between the first node and a third node, and the path detection packet is used to indicate to detect the connectivity of the segment routing (SR) path between the nodes.

15 Claims, 7 Drawing Sheets

(56)        References Cited

FOREIGN PATENT DOCUMENTS

JP         2014504093  A      2/2014
WO      WO-2016008322  A1  *   1/2016    ............. H04L 41/00

OTHER PUBLICATIONS

Z. Al et al.: draft-ali-spring-srv6-oam-00-Operations Administra-tion, and Maintenance (OAM) in Segment Routing Networks with IPv6 Data plane (SRv6) Feb. 26, 2018 (Feb. 26, 2018) XP055646114, 21 pages.

C. Pignataro et al, Seamless Bidirectional Forwarding Detection (S-BFD) , Internet Engineering Task Force (IETF), RFC 7880, Jul. 2016, 24 pages.

International Search Report and Written Opinion issued in PCT/CN2021/070591, dated Mar. 30, 2021, 11 pages.

Extended European Search Report issued in EP21778979.1, dated Jun. 29, 2023, 10 pages.

Office Action issued in CN202010246493.2, dated May 7, 2022, 8 pages.

Office Action issued in JP2022-559992, dated Dec. 22, 2023, with English translation, 5 pages.

* cited by examiner

700

800

CONNECTION STATUS DETECTION METHOD AND RELATED DEVICE

CROSS-REFERENCE TO RELATED APPLICATIONS

This application is a continuation of International Application No. PCT/CN2021/070591, filed on Jan. 7, 2021, which claims priority to Chinese Patent Application No. 202010246493.2, filed on Mar. 31, 2020. The disclosures of the aforementioned applications are hereby incorporated by reference in their entireties.

TECHNICAL FIELD

Embodiments of this application relate to the Internet field, and in particular, to a connection status detection method and a related device.

BACKGROUND

A segment routing tunnel (segment routing, SR Policy) is a new tunnel traffic steering technology developed based on a segment routing (SR) technology, and is different from a conventional implementation based on a tunnel interface. A series of innovations based on the SR Policy greatly expand application scope of segment routing traffic engineering (SR-TE), simplify deployment, and optimize performance. SR Policy-based SR-TE has been widely accepted in the industry, and is widely applied in fields such as fifth generation mobile communications technologies (fifth generation, 5G) and the Internet of Things.

On an SR Policy-based network, a path detection packet may be used to detect connectivity of an SR path between nodes. For example, a seamless bidirectional forwarding detection (SBFD) packet is used to detect whether a first node and a second node are in a connected state or a non-connected state.

SUMMARY

Embodiments of this application provide a connection status detection method and a related device.

A first aspect of embodiments of this application provides a connection status detection method, including the following steps.

A first node receives a path detection packet from a second node, where the path detection packet is used to detect connectivity of a segment routing (SR) path between the second node and the first node. When a cross-domain scenario is involved, for example, the second node establishes a connection to a third node through the first node, if connectivity of an SR path between the second node and the third node needs to be detected, the first node responds to the path detection packet based on connectivity of an SR path between the first node and the third node.

Embodiments of this application provide a method for detecting connectivity of an SR path in a cross-domain scenario. The second node may determine the connectivity of the SR path between the second node and the third node based on a response of the first node.

Based on the first aspect of embodiments of this application, in a first implementation of the first aspect of embodiments of this application, a target receiving endpoint of the path detection packet may be the third node, or a target receiving endpoint of the path detection packet may not be the third node, for example, the target receiving endpoint may be the first node.

Based on the first aspect or the first implementation of the first aspect of embodiments of this application, in a second implementation of the first aspect of embodiments of this application, the first node may determine the SR path between the first node and the third node based on an identifier of the path detection packet.

Embodiments of this application provide a manner in which the first node determines the SR path between the first node and the third node.

Based on any implementation of the first aspect to the second implementation of the first aspect of embodiments of this application, in a third implementation of the first aspect of embodiments of this application, when the connectivity of the SR path between the second node and the third node is detected, the first node may respond to the path detection packet based on connectivity of the SR path between the first node and the third node. When the SR path between the first node and the third node is in a connected state, the response may be a response to the SR path between the first node and the third node being in the connected state, and is used to notify the second node that the SR path between the second node and the third node is in the connected state. When the SR path between the first node and the third node is in a non-connected state, the response may be a response to the SR path between the first node and the third node being in the non-connected state, and is used to notify the second node that the SR path between the second node and the third node is in the non-connected state.

Based on the third implementation of the first aspect of embodiments of this application, in a fourth implementation of the first aspect of embodiments of this application, the first node may notify, in a plurality of manners, the second node that the SR path between the second node and the third node is in the non-connected state. For example, the first node notifies, by skipping sending a response packet for the path detection packet to the second node, the second node that the SR path between the second node and the third node is in the non-connected state; or the first node notifies, by sending a response packet for the path detection packet to the second node, the second node that the SR path between the second node and the third node is in the non-connected state.

In embodiments of this application, the first node may notify, in a plurality of manners, the second node that the SR path between the second node and the third node is in the non-connected state, thereby improving flexibility of the solution.

Based on any implementation of the first aspect to the fourth implementation of the first aspect of embodiments of this application, in a fifth implementation of the first aspect of embodiments of this application, the path detection packet may be a seamless bidirectional forwarding detection (SBFD) packet, and the first node receives the path detection packet based on a segment routing traffic engineering (SR TE) policy tunnel from the second node to the third node.

Based on the fifth implementation of the first aspect of embodiments of this application, in a sixth implementation of the first aspect of embodiments of this application, a specific manner in which the first node determines the connectivity between the first node and the third node includes: if one of the following conditions is met, the SR path between the first node and the third node is in the non-connected state; otherwise, the SR path between the first node and the third node is in the connected state. The conditions are: a BGP EPE label configured by the first node for the third node is in an invalid state; the first node detects that a bidirectional forwarding detection (BFD) session state is a down state; a static BDF session on an interface of the first node is in a down state; and a state of an interface that is on the first node and that is configured to be connected to the third node is a down state.

A second aspect of embodiments of this application provides a connection status detection method, including the following steps.

A second node sends a path detection packet to a first node, where the path detection packet is used to detect connectivity of a segment routing (SR) path between the second node and the first node. When a cross-domain scenario is involved, for example, the second node establishes a connection to a third node through the first node, if connectivity of an SR path between the second node and the third node needs to be detected, the second node determines the connectivity of the SR path between the second node and the third node based on a response of the first node to the path detection packet.

Embodiments of this application provide a method for detecting connectivity of an SR path in a cross-domain scenario. The second node may determine connectivity of the SR path between the second node and the third node based on the response of the first node.

Based on the second aspect of embodiments of this application, in a first implementation of the second aspect of embodiments of this application, a target receiving endpoint of the path detection packet may be the third node, or a target receiving endpoint of the path detection packet may not be the third node, for example, the target receiving endpoint may be the first node.

Based on the second aspect or the first implementation of the second aspect of embodiments of this application, in a second implementation of the second aspect of embodiments of this application, the path detection packet may be an SBFD packet, and the second node may send the path detection packet to the first node based on a segment routing traffic engineering (SR TE) policy tunnel from the second node to the third node.

Embodiments of this application provide a specific path detection packet and a channel over which the second node sends the path detection packet to the first node.

A third aspect of embodiments of this application provides a detection apparatus. The detection apparatus may be used as a first node to perform the method in the first aspect and the implementations of the first aspect.

A fourth aspect of embodiments of this application provides a detection apparatus. The detection apparatus may be used as a second node to perform the method in the second aspect and the implementations of the second aspect.

A fifth aspect of embodiments of this application provides a detection apparatus. The detection apparatus may be used as a first node, and includes a processor, a memory, a bus, and an input/output device. The processor performs the method in the first aspect and the implementations of the first aspect.

A sixth aspect of embodiments of this application provides a detection apparatus. The detection apparatus may be used as a second node, and includes a processor, a memory, a bus, and an input/output device. The processor performs the method in the second aspect and the implementations of the second aspect.

A seventh aspect of embodiments of this application provides a computer storage medium. The computer storage medium stores instructions, and when the instructions are executed on a computer, the computer is enabled to perform the implementations of the first aspect or the second aspect.

An eighth aspect of embodiments of this application provides a computer program product. When the computer program product is executed on a computer, the computer is enabled to perform the implementations of the first aspect or the second aspect.

DESCRIPTION OF EMBODIMENTS

An embodiment of this application provides a connection status detection method.

Figures 1, 2:
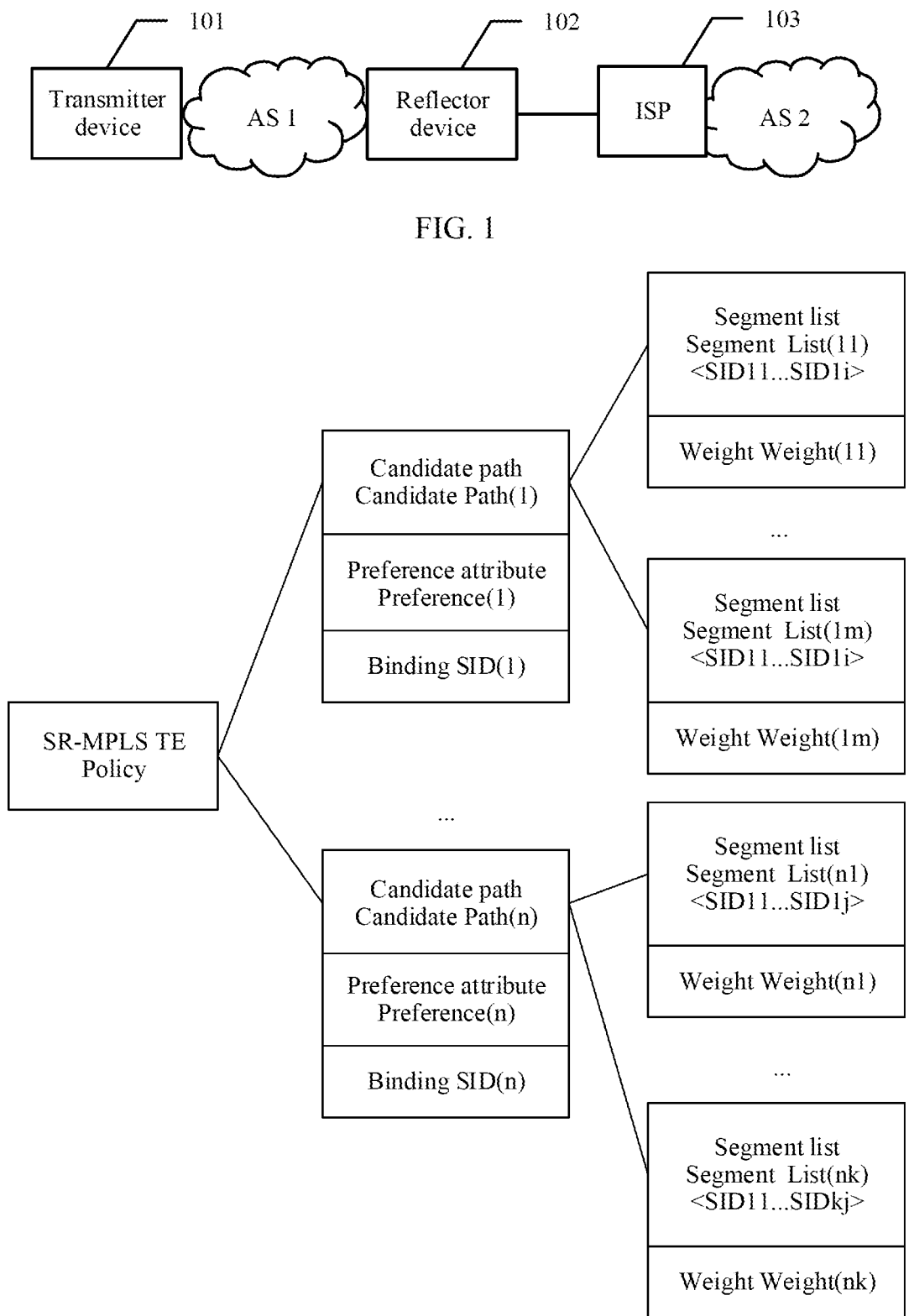
FIG. 1 is a schematic diagram of a network framework according to an embodiment of this application.
FIG. 2 is a schematic diagram of a segment identifier list according to an embodiment of this application.

Refer to FIG. 1, a network structure framework according to an embodiment of this application includes:

a transmitter device (Header) 101, a reflector device (Endpoint) 102, and a network service provider (internet service provider, ISP) 103.

The transmitter device 101 is connected to the ISP 103 through the reflector device 102, and the transmitter device 101 may determine connectivity of an SR path between transmitter device 101 and the ISP 103 by using an SBFD packet.

An SR Policy is established between the transmitter device 101 and the reflector device 102. The SR Policy is a new tunnel traffic steering technology developed based on an SR technology. An SR Policy path is represented as a segment list of a specified path, which is referred to as a segment identifier (SID) list. Each SID list indicates a path from a specified source start point to a destination endpoint, that is, an end-to-end path, for example, a path from the transmitter device 101 to the reflector device 102. The SID list indicates a device in a network to follow a specified path rather than a shortest path calculated according to another rule. If a data packet is imported into the SR Policy, a SID list is added to the data packet by a header (for example, the transmitter device 101), and other devices in the network execute instructions embedded in the SID list.

The SR Policy includes three parts: a header (for example, the transmitter device 101) which is a node generated by the SR Policy; color, which is an extended community attribute carried by the SR Policy, where a BGP route carrying a same color attribute may use the SR Policy; and an endpoint (for example, the reflector device 102), which is a destination address of the SR Policy.

With reference to the network structure framework shown in FIG. 1, the following describes an SR Policy model in an embodiment of this application. As shown in FIG. 2, an SR Policy system may include a plurality of candidate paths.

Each of the plurality of candidate paths carries a preference attribute and an SID. A valid candidate path with highest preference functions as a primary path of the SR Policy system, and a valid path with second highest preference functions as a hot-standby path of the SR Policy system. A candidate path may include a plurality of segment lists, and each segment list may carry a weight attribute. Each segment list is an explicit label stack, and the segment list can indicate a network device to forward a packet.

An interior gateway protocol for SR (IGP for SR) can only allocate SIDs in an autonomous system (AS) domain. A path in the AS domain is planned by appropriately orchestrating SIDs in the AS domain. In a large-scale network, usually a plurality of Aas need to be spanned. For example, in FIG. 1, there are two AS domains (AS1 and AS2). The IGP for SR cannot allocate SIDs across domains. A border gateway protocol for segment routing (BGP for SR) is an extension of BGP for SR, and can allocate SIDs based on BGP information and report the information to a control device, such as a transmit device. Then, when SR-TE orchestrates a path, the SID is used as a part in the path orchestration, to obtain an optimal cross-domain SR-TE path.

In certain embodiments of this application, the transmitter device may be referred to as a second node, the reflector device may be referred to as a first node, and the ISP may be referred to as a third node. If there are a plurality of ISPs, for example, there are n ISPs, where n is a positive integer greater than or equal to 2, the n ISPs are sequentially named the third node to an (n+2)$^{th}$ node.

Figure 3:
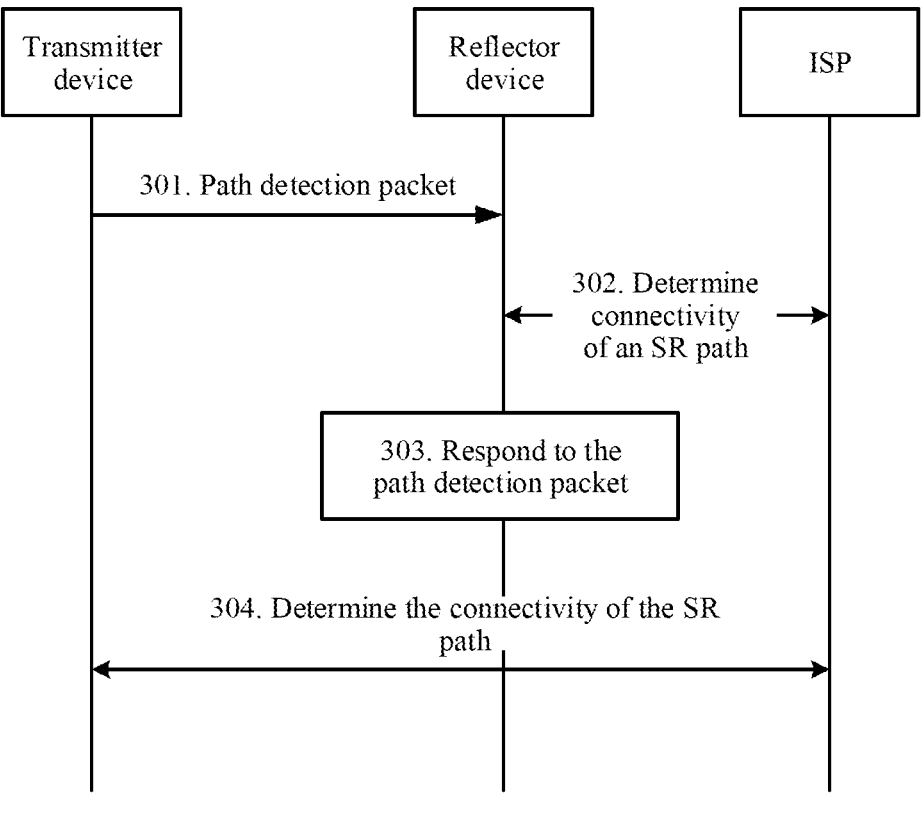
FIG. 3 is a flowchart of a connection status detection method according to an embodiment of this application.

With reference to the network framework diagram in FIG. 1, a transmitter device in the embodiment shown in FIG. 3 may be the transmitter device 101 shown in FIG. 1, a reflector device may be the reflector device 102 shown in FIG. 1, and a third node may be the ISP 103 shown in FIG. 1. Refer to FIG. 3. An embodiment of a connection status detection method in embodiments of this application includes steps 301 to 304. Details are as follows.

301. A transmitter device sends a path detection packet to a reflector device.

The transmitter device sends, to the reflector device, the path detection packet used to detect connectivity of an SR path between the transmitter device and the reflector device.

The path detection packet may be an SBFD packet, a BFD packet, or the like. In this embodiment of this application, only the SBFD packet is used as an example for description.

Figure 4:
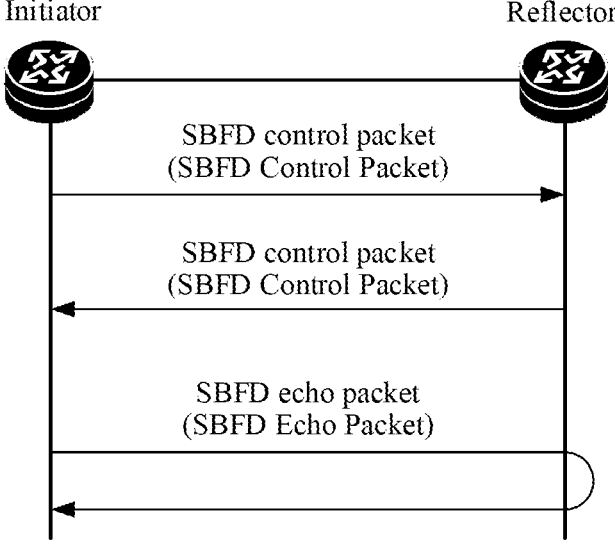
FIG. 4 is a schematic diagram of an SBFD packet mechanism according to an embodiment of this application.

Refer to FIG. 4, the following describes an SBFD packet mechanism. Before link detection, an initiator device and a reflector device send an SBFD control packet to each other. The SBFD control packet is used to advertise information such as an SBFD discriminator, and the SBFD discriminator may include a my discriminator (MD) value and a your discriminator (YD) value. During the link detection, the initiator device actively sends an SBFD Echo packet. In embodiments of this application, the SBFD Echo packet is referred to as an SBFD packet. The reflector device loops back the packet based on a status of the reflector device. The initiator device determines a link connection status based on a response packet. The initiator device is a detection device, and configures a detection packet such as an SBFD packet. The reflector device receives the detection packet of the initiator. A case in which the detection packet is an SBFD packet is used as an example. The reflector device checks whether an SBFD discriminator in the packet matches a locally configured global SBFD discriminator. If the SBFD discriminator matches the locally configured global SBFD discriminator and a preset condition is met (for example, the reflector device is in a working state, and an SR path between the reflector device and an ISP is in a connected state), the reflector device sends a response packet to the initiator device.

If the SBFD packet carries a border gateway protocol (BGP) egress peer engineering (EPE) label, after identifying the BGP EPE label, the reflector device does not perform steps 302 and 303. Therefore, when configuring the SBFD packet, the transmitter device does not configure a BGP EPE label for the SBFD packet.

It needs to be noted that FIG. 4 does not show an execution sequence of the operations, and the execution sequence of the operations is determined by internal logic of the operations.

Figure 5:
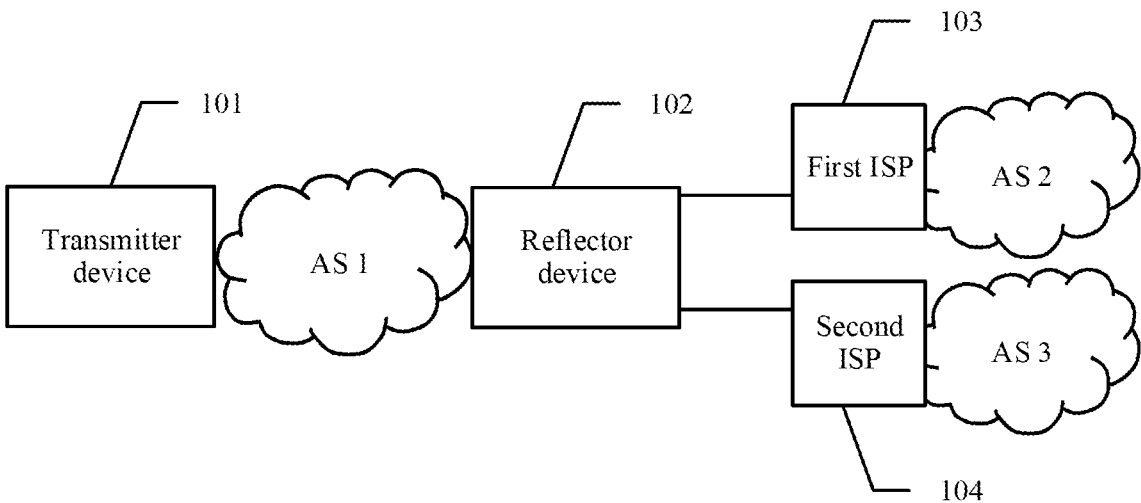
FIG. 5 is a schematic diagram of another network framework according to an embodiment of this application.

Refer to FIG. 5. In embodiments of this application, there may be a plurality of ISPs. A case in which there are only two ISPs (a first ISP 103 and a second ISP 104) is used as an example for description in this embodiment. To detect connectivity of an SR path between a transmitter device and the first ISP 103, the transmitter device 101 configures a first path detection packet, and sends the first path detection packet to a reflector device 102. The reflector device 102 determines an SR path between the reflector device 102 and the first ISP 103 based on an identifier of the path detection packet. Similarly, to detect connectivity of an SR path between the transmitter device and the second ISP 104, the transmitter device 101 configures a second path detection packet, and sends the second path detection packet to the reflector device 102. The reflector device 102 determines an SR path between the reflector device 102 and the second ISP 104 based on an identifier of the path detection packet.

It may be understood that both the first path detection packet and the second path detection packet are path detection packets. When the path detection packet is an SBFD packet, an identifier of the path detection packet may be an MD value or a local field in the packet. This is not specifically limited herein.

302. The reflector device determines connectivity of an SR path between the reflector device and the ISP.

There are many manners in which the reflector device determines the connectivity of the SR path between the reflector device and the ISP. If one of the following conditions is met, the SR path between the reflector device and the ISP is in a non-connected state; otherwise, the SR path between the reflector device and the ISP is in a connected state.

A. A BGP EPE label configured by the reflector device for the ISP is invalid.

B. The reflector device detects that a bidirectional forwarding detection (BFD) session is in a down state.

C. A static BFD session on an interface of the reflector device is in a down state.

D. An interface that is on the reflector device and that is configured to be connected to the ISP is in a down state.

It may be understood that the foregoing conditions are merely some examples, and a specific determining manner is not limited. If any one of the foregoing states is met, the reflector device determines that the SR path between the reflector device and the ISP is in the non-connected state. In a process of determining connectivity of the SR path between the reflector device and the ISP, the reflector device may not communicate with the ISP.

303. The reflector device responds to the path detection packet based on the connectivity of the SR path between the reflector device and the ISP.

When the SR path between the reflector device and the ISP is in the connected state, the reflector device responds, to the path detection packet, that the SR path between the reflector device and the ISP is in the connected state. The response is a connection response, and the connection response may indicate that the SR path between the transmitter device and the ISP is in the connected state.

When the SR path between the reflector device and the ISP is in the non-connected state, the reflector device responds, to the path detection packet, that the SR path between the reflector device and the ISP is in the non-connected state. The response is a non-connection response, and the non-connection response may indicate that the SR path between the transmitter device and the ISP is in the non-connected state.

There are a plurality of specific forms of the connection response and the non-connection response. For example, the connection response may be a different response packet from the non-connection response, or the connection response is a specific response packet, and the non-connection response is not returning a response packet to the transmitter device. A specific form is not limited herein.

If there are a plurality of ISP devices (the first ISP 103 and the second ISP 104 shown in FIG. 5), the reflector device determines the SR path between the reflector device and the first ISP 103 based on an identifier carried in the received first path detection packet, determines connectivity of the SR path, and responds to the first path detection packet based on the connectivity. Similarly, the reflector device determines the SR path between the reflector device and the second ISP 104 based on an identifier carried in the received second path detection packet, determines connectivity of the SR path, and responds to the second path detection packet based on the connectivity.

When the path detection packet is an SBFD packet, the identifier of the path detection packet may be an MD value or a local field in the packet. The following separately describes the MD value and the local field.

Figure 6:
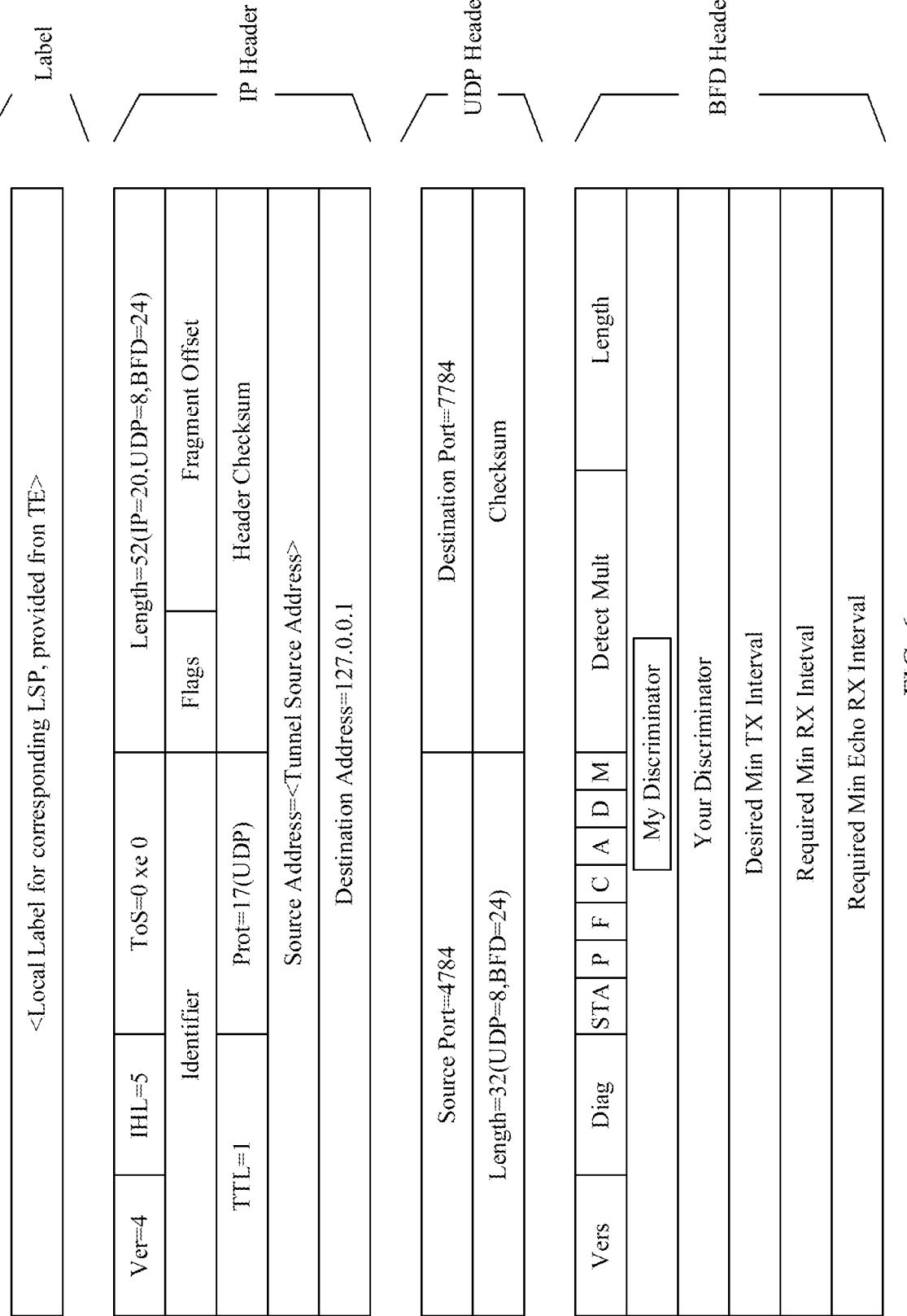
FIG. 6 is a schematic diagram of an SBFD packet mechanism according to an embodiment of this application.

The MD value (My Discriminator value) of the SBFD packet is unique. As shown in FIG. 6, as described in the RFC 7880, every SBFD initiator must have a locally unique MD value allocated from a BFD discriminator pool (Every SBFD Initiator MUST have a locally unique My Discriminator value allocated from the BFD Discriminator pool). The transmitter device may obtain an MD value for configuring an SBFD packet by viewing the BFD discriminator pool or receive an MD value manually configured by a user. The reflector device determines an SR path by identifying the MD value carried in a received SBFD packet. If the SBFD packet is the first path detection packet, the reflector device determines the SR path between the transmitter device and the ISP based on the MD value carried in the SBFD packet.

When configuring the SBFD packet, the transmitter device may add a local field, for example, a label 5, to the packet. After identifying the label, the reflector device determines the SR path based on the label. If the SBFD packet is the first path detection packet, the SR path between the transmitter device and the ISP is determined based on the local field carried in the SBFD packet.

304. The transmitter device determines the connectivity of the SR path.

The transmitter device determines the connectivity of the SR path between the transmitter device and the ISP based on the response of the reflector device to the path detection packet.

If the transmitter device receives the connection response, the transmitter device determines that the SR path between the transmitter device and the ISP is in the connected state. If the transmitter device receives the non-connection response, the transmitter device determines that the SR path between the transmitter device and the ISP is in the non-connected state.

In actual application, to reduce misjudgment caused by factors such as a packet loss, the transmitter device may send a plurality of path detection packets used to detect connectivity of an SR path. The transmitter device determines the connectivity of the SR path based on received responses to the path detection packets. For example, if all responses received by the transmitter device are non-connection responses, then the SR path is in a non-connected state is determined.

It needs to be noted that FIG. 3 does not show an execution sequence of the operations, and the execution sequence of the operations is determined by internal logic of the operations.

This embodiment provides a method for detecting connectivity of an SR path in a cross-domain scenario. A transmitter device may determine connectivity of an SR path between the transmitter device and an ISP based on a response of a reflector device. For example, when an SR path between the reflector device and the ISP is in a connected state, the reflector device returns a response packet to the transmitter device, and when an SR path between the reflector device and the ISP is in a non-connected state, the reflector device does not return a response packet to the transmitter device. In this case, when the transmitter device receives the response packet, an SR path between the transmitter device and the reflector device is in the connected state, and the SR path between the reflector device and the ISP is in the connected state. In other words, if the transmitter device receives the response packet, the SR path between the transmitter device and the ISP is in the connected state. When the transmitter device does not receive the response packet from the reflector device, the SR path between the transmitter device and the reflector device is in the non-connected state, or the SR path between the reflector device and the ISP is in the non-connected state. In other words, if the transmitter device does not receive the response packet, the SR path between the transmitter device and the ISP is in the non-connected state.

Figure 7:
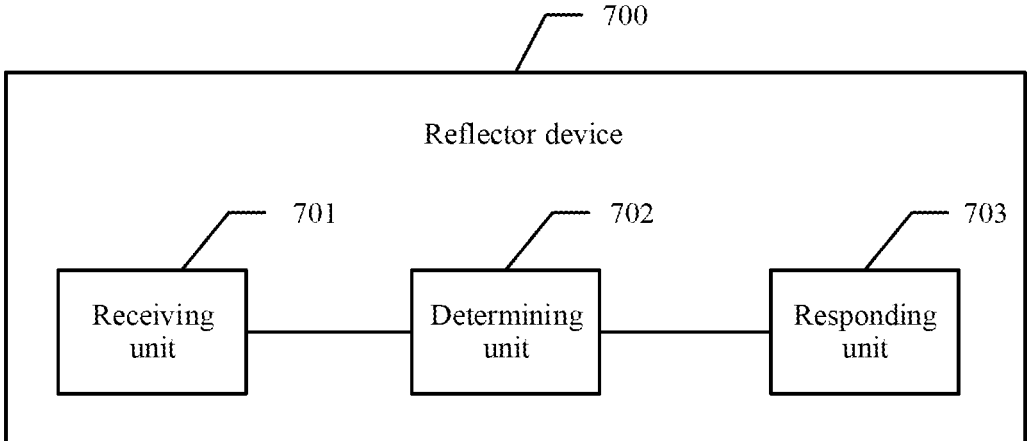
FIG. 7 to FIG. 10 are schematic diagrams of structures of detection apparatuses according to an embodiment of this application.

The foregoing describes the connection status detection method in embodiments of this application, and the following describes an apparatus in embodiments of this application. Refer to FIG. 7, an embodiment of a reflector device in embodiments of this application includes:

a receiving unit 701, configured to receive a path detection packet;

a determining unit 702, configured to determine an SR path between the reflector device and an ISP based on an identifier of the path detection packet; and a responding unit 703, configured to respond to the path detection packet based on connectivity of the SR path between the reflector device and the ISP.

The reflector device shown in FIG. 7 may be a reflector device in another embodiment of this application. A plurality of units in the reflector device shown in FIG. 7 may enable the reflector device to perform operations performed by a reflector device in another embodiment of this application.

Figure 8:
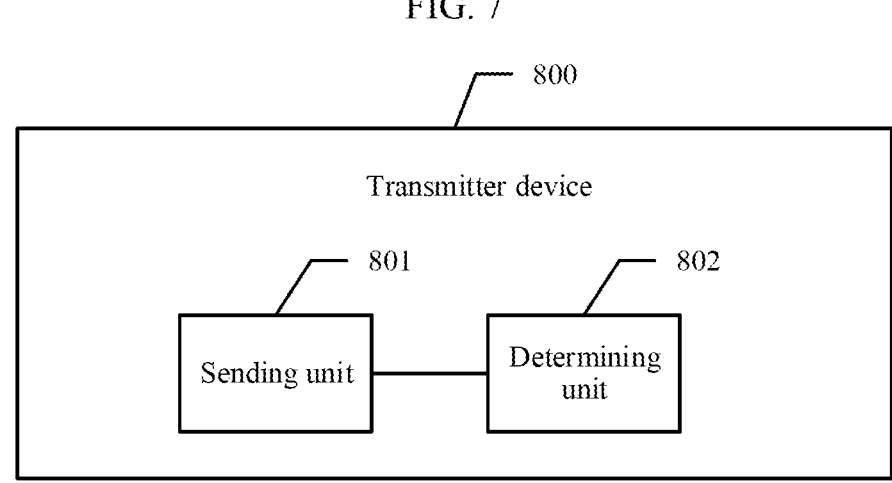

Refer to FIG. 8, an embodiment of a transmitter device in embodiments of this application includes:

a sending unit 801, configured to send a path detection packet to a reflector device; and a determining unit 802, configured to determine connectivity of a segment routing (SR) path between the transmitter device and an ISP based on a response of the reflector device to the path detection packet.

The device shown in FIG. 8 may be a transmitter device in another embodiment of this application. A plurality of units in the detection device shown in FIG. 8 may enable the detection device to perform operations performed by a transmitter device in another embodiment of this application.

Figure 9:
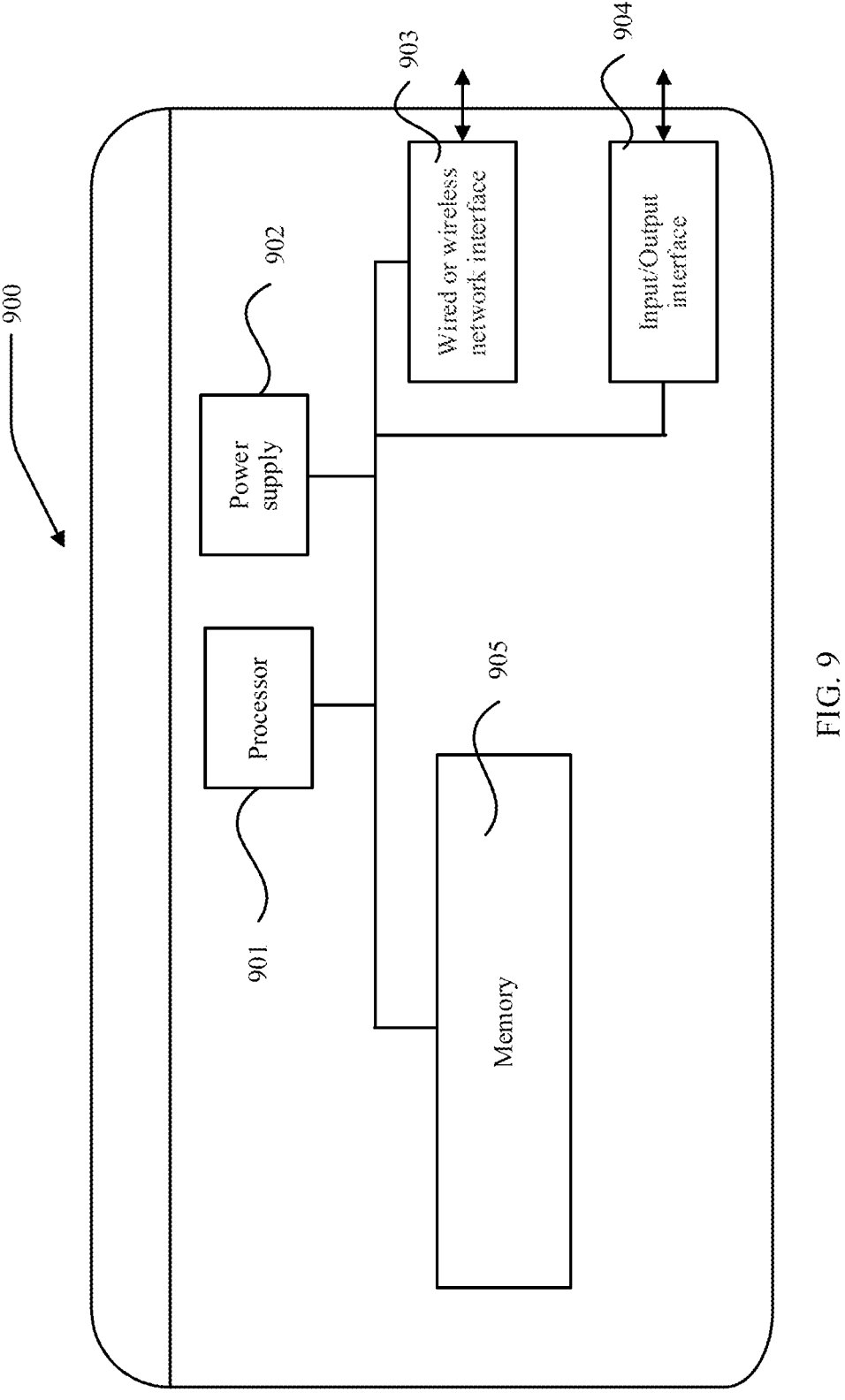

Refer to FIG. 9, an embodiment of this application provides a detection device 900, and the detection device may be used as a reflector device. The detection device 900 may include one or more processors 901 and a memory 905. The memory 905 stores program code. Further, the memory 905 may store data.

The memory 905 may be a volatile memory, a nonvolatile memory, or a persistent memory. The program code stored in the memory 905 may include one or more modules, and each module may include a series of instruction operations for the detection device. Further, the processor 901 may be configured to communicate with the memory 905, and perform the series of instruction operations in the memory 905 in the detection device 900.

The detection device 900 may further include one or more power supplies 902, one or more wired or wireless network interfaces 903, one or more input/output interfaces 904, and/or one or more operating systems, for example, any one of a Microsoft system (Windows), an Android system, an Apple operating system (Mac OS), a Unix system, or a Linux system.

By executing computer-executable instructions in the memory 905, the processor 901 may perform the operations performed by the reflector device in the embodiment shown in FIG. 3 or another embodiment of this application. Details are not described herein again.

The processor 901 may be one or more central processing units CPUs, network processing units NPUs, application specific integrated circuits (ASICs), or other chips, or a combination of a plurality of types of chips, or some processors of other types. The memory 905 may be one or more random access memories (RAMs), read-only memories (ROMs), a combination of a plurality of memories of different types, or some memories of other types.

Figure 10:
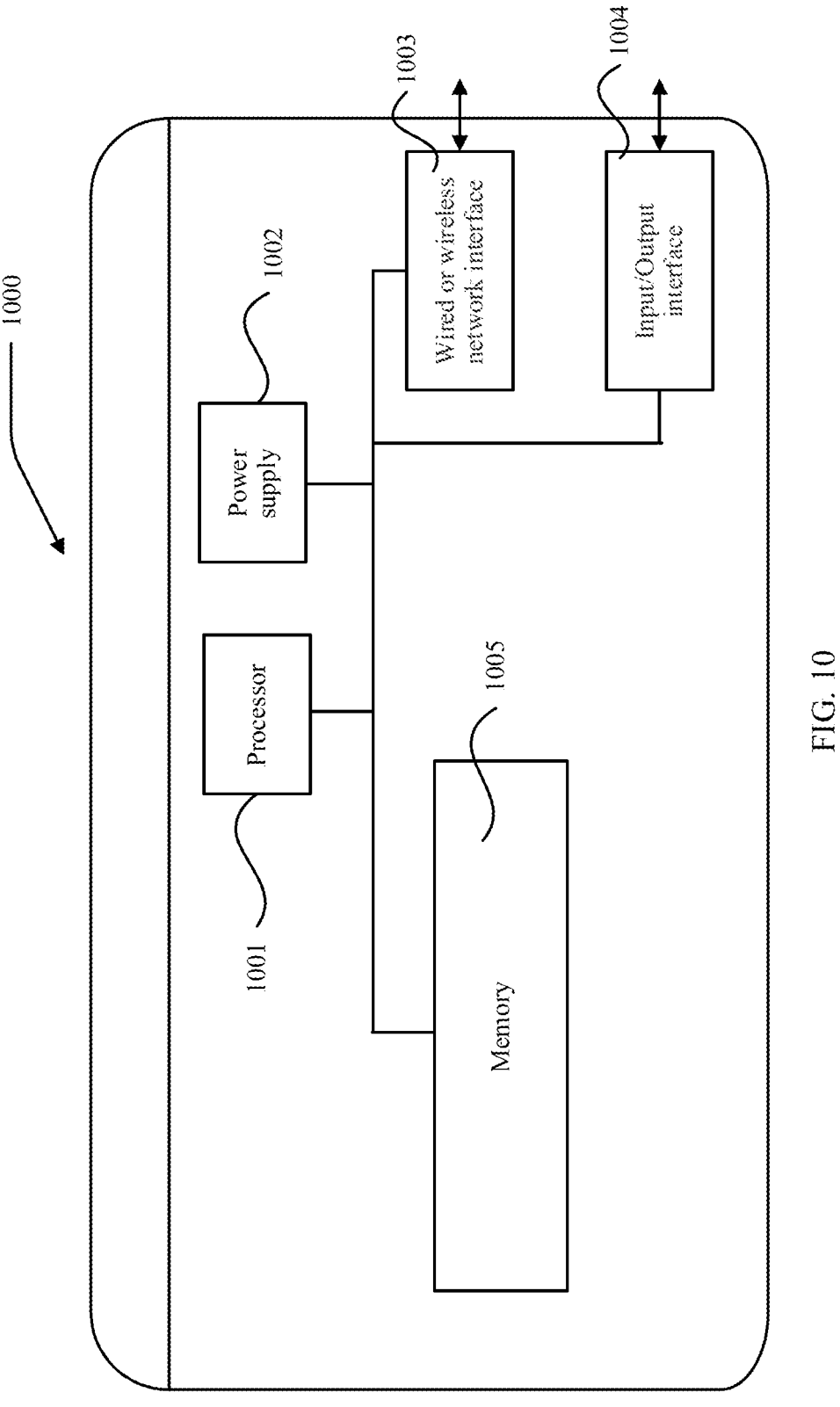

Refer to FIG. 10, an embodiment of this application provides a detection device 1000, and the detection device may be used as a transmitter device. The detection device 1000 may include one or more processors 1001 and a memory 1005. The memory 1005 stores program code.

Further, the memory 1005 may store data.

The memory 1005 may be a volatile memory, a nonvolatile memory, or a persistent memory. The program code stored in the memory 1005 may include one or more modules, and each module may include a series of instruction operations for the detection device. Further, the processor 1001 may be configured to communicate with the memory 1005, and perform the series of instruction operations in the memory 1005 in the detection device 1000.

The detection device 1000 may further include one or more power supplies 1002, one or more wired or wireless network interfaces 1003, one or more input/output interfaces 1004, and/or one or more operating systems, for example, any one of a Microsoft system (Windows), an Android system, an Apple operating system (Mac OS), a Unix system, or a Linux system.

By executing computer-executable instructions in the memory 1005, the processor 1001 may perform the operations performed by the transmitter device in the embodiment shown in FIG. 3 or another embodiment of this application. Details are not described herein again.

The processor 1001 may be one or more central processing units CPUs, network processing units NPUs, application specific integrated circuits (ASICs), or other chips, or a combination of a plurality of types of chips, or some processors of other types. The memory 1005 may be one or more random access memories (RAMs), read-only memories (ROMs), a combination of a plurality of memories of different types, or some processors of other types.

This application provides a detection device. The detection device may be used as a reflector device or a transmitter device. The detection device is coupled to a memory, and is configured to read and execute instructions stored in the memory, so that the detection device implements the steps of the method performed by the reflector device or the transmitter device in any one of the implementations in FIG. 3. In an example embodiment, the detection device is a chip or a system-on-a-chip.

This application provides a chip system. The chip system includes a processor, and is configured to support a reflector device or a transmitter device in implementing functions in the foregoing aspects, for example, sending or processing data and/or information in the foregoing methods. In an example embodiment, the chip system further includes a memory. The memory is configured to store necessary program instructions and data. The chip system may include a chip, or may include a chip and another discrete device.

In another example embodiment, when the chip system is a chip in the reflector device, the transmitter device, or the like, the chip includes a processing unit and a communications unit. The processing unit may be, for example, a processor, and the communications unit may be, for example, an input/output interface, a pin, or a circuit. The processing unit may execute computer-executable instructions stored in a storage unit, so that a chip in the reflector device, the transmitter device, or the like, performs the steps performed by the reflector device or the transmitter device in any one of the foregoing embodiments in FIG. 3. Optionally, the storage unit is a storage unit in the chip, for example, a register or a cache. The storage unit may alternatively be a storage unit that is in the UE or the base station and that is located outside the chip, for example, a read-only memory (ROM), or another type of static storage device capable of storing static information and instructions, or a random access memory (RAM).

An embodiment of this application further provides a processor, configured to be coupled to a memory, and perform the method and the function that are related to the reflector device in any one of the foregoing embodiments.

An embodiment of this application further provides a processor, configured to be coupled to a memory, and perform the method and the function that are related to the transmitter device in any one of the foregoing embodiments.

An embodiment of this application further provides a computer-readable storage medium. The computer-readable storage medium stores a computer program. When the computer program is executed by a computer, the method procedure related to the reflector device or the transmitter device in any one of the foregoing method embodiments is implemented. Correspondingly, the computer may be the foregoing reflector device or the transmitter device.

It should be understood that the processor mentioned in the reflector device, the transmitter device, the chip system, and the like in the foregoing embodiments of this application, or the processor provided in the foregoing embodiments of this application may be a central processing unit (CPU), or may be another general purpose processor, a digital signal processor (DSP), an application specific integrated circuit (ASIC), a field programmable gate array (FPGA), or another programmable logic device, a discrete gate or transistor logic device, a discrete hardware component, or the like. The general purpose processor may be a microprocessor, or the processor may be any conventional processor or the like.

It should be further understood that there may be one or more processors in the reflector device, the transmitter device, the chip system, and the like in the foregoing embodiments of this application, and the quantity may be adjusted based on an actual application scenario. This is merely an example for description herein, and does not constitute a limitation. There may be one or more memories in embodiments of this application, which may be adjusted based on an actual application scenario. This is merely an example for description herein, and does not constitute a limitation.

It should be further understood that the memory, the readable storage medium, or the like mentioned in the reflector device, the transmitter device, the chip system, or the like in the foregoing embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. By way of example but not limitation, many forms of RAMs are available, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), and a synchlink dynamic random access memory (synchlink DRAM, SLDRAM), and a direct rambus random access memory (direct rambus RAM, DR RAM).

It needs to be further noted that when the reflector device or the transmitter device includes a processor (or a processing unit) and a memory, the processor in this application may be integrated with the memory, or the processor and the memory may be connected by using an interface. This may be adjusted based on an actual application scenario, and is not limited.

An embodiment of this application further provides a computer program or a computer program product including a computer program. When the computer program is executed on a computer, the computer is enabled to implement the method procedure of the reflector device or the transmitter device in any one of the foregoing method embodiments. Correspondingly, the computer may be the foregoing reflector device or the transmitter device.

All or some of the embodiments in FIG. 3 may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedures or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software functional unit and sold or used as an independent product, the integrated unit may be stored in a computer-readable storage medium. Based on such an understanding, the technical solutions of this application essentially, or a part contributing to the prior art, or all or some of the technical solutions may be implemented in the form of a software product. The computer software product is stored in a storage medium and includes several instructions for instructing a computer device (which may be a personal computer, a server, or another network device) to perform all or some of the steps of the methods in the embodiments in FIG. 2 to FIG. 9 of this application. The storage medium includes various media that can store program code, such as a USB flash drive, a removable hard disk, a read-only memory (ROM), a random access memory (RAM), a magnetic disk, or an optical disc.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, and this is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Names of messages/frames/information, modules, units, or the like provided in the embodiments of this application are merely examples, and other names may be used provided that the messages/frames/information, modules, units, or the like have same functions.

The terms used in embodiments of this application are merely for the purpose of illustrating specific embodiments, and are not intended to limit the present application. Terms "a", "the", and "this" of singular forms used in embodiments of this application are also intended to include plural forms, unless otherwise specified in a context clearly. It should be further understood that, in the descriptions of this application, "/" represents an "or" relationship between associated objects, unless otherwise specified. For example, A/B may represent A or B. A term "and/or" in this application is merely an association relationship between associated objects, and represents that three relationships may exist. For example, A and/or B may represent any one of the following three cases: Only A exists, both A and B exist, or only B exists, where A and B each may be singular or plural.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for detecting connection status, comprising:
receiving, by a first node, a path detection packet from a second node, wherein connectivity of a segment routing (SR) path between the second node and the first node is detected using the path detection packet; and
sending, by the first node, a response to the second node in response to the path detection packet based on connectivity of an SR path between the first node and a third node, the response notifying the second node about connectivity of an SR path between the second node and the third node, wherein sending, by the first node, the response to the second node in response to the path detection packet based on connectivity of the SR path between the first node and the third node comprises:
in response to a connected state of the SR path between the first node and the third node, notifying, by the first node, the second node that the SR path between the second node and the third node is in a connected state; and
in response to a non-connected state of the SR path between the first node and the third node, notifying, by the first node, the second node that the SR path between the second node and the third node is in a non-connected state,
wherein the first node is a reflector device that generates the response using the connectivity of the SR path between the first node and the third node to indicate the connectivity of the SR path between the second node and the third node, and
wherein the path detection packet is received by the first node based on a segment routing traffic engineering (SR-TE) policy tunnel from the second node to the third node.

2. The method according to claim 1, wherein a target receiving endpoint of the path detection packet is the first node or the third node.

3. The method according to claim 1, further comprising:
determining, by the first node, the SR path between the first node and the third node based on an identifier of the path detection packet.

4. The method according to claim 1, wherein:
the notifying the second node that the SR path between the second node and the third node is in the non-connected state comprises skipping sending a response packet for the path detection packet to the second node; and
the notifying the second node that the SR path between the second node and the third node is in the non-connected state comprises sending a response packet for the path detection packet to the second node.

5. The method according to claim 1, wherein the path detection packet is a seamless bidirectional forwarding detection (SBFD) packet.

6. The method according to claim 1, wherein the first node is a reflector device, the second node is a transmitter device, and the third node is an internet service provider (ISP).

7. The method according to claim 1, wherein the first node determines that the connectivity of the SR path between the first node and the third node is in a non-connected state when one of the following conditions is met:
a border gateway protocol (BGP) egress peer engineering (EPE) label configured by the first node for the third node is invalid;
the first node detects that a bidirectional forwarding detection (BFD) session is in a down state;
a static BFD session on an interface of the first node is in a down state; or
an interface that is on the first node and configured to be connected to the third node is in a down state.

8. A detection apparatus used as a first node, comprising:
a non-transitory memory storing instructions; and
at least one processor coupled to the non-transitory memory, wherein the instructions, when executed by the at least one processor, cause the detection apparatus to be configured to:
receive a path detection packet from a second node, wherein connectivity of a segment routing (SR) path between the second node and the first node is detected using the path detection packet; and send a response to the second node in response to the path detection packet based on connectivity of an SR path between the first node and a third node, the response notifying the second node about connectivity of an SR path between the second node and the third node, wherein sending of the response to the second node in response to the path detection packet based on connectivity of the SR path between the first node and the third node comprises:

in response to a connected state of the SR path between the first node and the third node, notifying the second node that the SR path between the second node and the third node is in a connected state; and in response to a non-connected state of the SR path between the first node and the third node, notifying the second node that the SR path between the second node and the third node is in a non-connected state, wherein the first node is a reflector device that generates the response using the connectivity of the SR path between the first node and the third node to indicate the connectivity of the SR path between the second node and the third node, and wherein the path detection packet is received by the first node based on a segment routing traffic engineering (SR-TE) policy tunnel from the second node to the third node.

9. The detection apparatus according to claim 8, wherein a target receiving endpoint of the path detection packet is the first node or the third node.

10. The detection apparatus according to claim 8, wherein the instructions, when executed by the at least one processor, further cause the detection apparatus to be configured to:

determine the SR path between the first node and the third node based on an identifier of the path detection packet.

11. The detection apparatus according to claim 8, wherein the notifying the second node that the SR path between the second node and the third node is in the non-connected state comprises skipping sending a response packet for the path detection packet to the second node; and the notifying the second node that the SR path between the second node and the third node is in the non-connected state comprises sending a response packet for the path detection packet to the second node.

12. The detection apparatus according to claim 8, wherein the path detection packet is a seamless bidirectional forwarding detection (SBFD) packet.

13. A detection apparatus used as a second node, comprising:

a non-transitory memory storing instructions; and at least one processor coupled to the non-transitory memory; wherein the instructions, when executed by the at least one processor, cause the detection apparatus to be configured to:

send a path detection packet to a first node, wherein connectivity of a segment routing (SR) path between the first node and the second node is detected using the path detection packet;

receive a response to the path detection packet from the first node, the response notifying the second node about connectivity of an SR path between the second node and a third node, wherein the response notifies the second node that the SR path between the second node and the third node is in a connected state based on that a SR path between the first node and the third node is in a connected state, and the response notifies the second node that the SR path between the second node and the third node is in a non-connected state based on that the SR path between the first node and the third node is in a non-connected state; and determine connectivity of a segment routing (SR) path between the second node and the third node based on the response, wherein the first node is a reflector device that generates the response using the connectivity of the SR path between the first node and the third node to indicate the connectivity of the SR path between the second node and the third node, and wherein the path detection packet is received by the first node based on a segment routing traffic engineering (SR-TE) policy tunnel from the second node to the third node.

14. The detection apparatus according to claim 13, wherein a target receiving endpoint of the path detection packet is the first node or the third node.

15. The detection apparatus according to claim 13, wherein the path detection packet is a seamless bidirectional forwarding detection (SBFD) packet.

* * * * *